July 5, 1966 W. W. GARSTANG 3,259,857

CONDUCTOR HAVING DISTRIBUTED CAPACITANCE

Filed July 30, 1963

INVENTOR.
William W. Garstang
BY
Pendleton, Neuman,
Seibold & Williams
Att'ys 3,259,857

CONDUCTOR HAVING DISTRIBUTED CAPACITANCE

William W. Garstang, Milwaukee, Wis., assignor to Globe-Union Inc., Milwaukee, Wis., a corporation of Delaware Filed July 30, 1963, Ser. No. 298,735
5 Claims. (Cl. 333—29)

This invention relates to electrical conductors, and more particularly to an elongate conductor having a distributed capacitance along its length.

Such a conductor is peculiarly adapted for use in television tuners and the like as a low pass filter which by-passes unwanted high frequency components to ground.

Prior art attempts to confine the unwanted high frequencies within a shielding can or the like surrounding the tuner have been only partially successful in that high frequencies formed as intermodulation products in the tuner escape through the seams of the shielding can, and through small holes which may be present in the can. These unwanted high frequencies cause interference known as TVI interference, which has a deleterious effect on the operation of other television sets and other high frequency equipment. Great care must therefore be exercised in the construction and installation of the shielding can around components which might radiate the interfering frequencies. Holes in the can through which low frequency leads such as for filament power and the like protrude, are generally plugged with feed-thru capacitors, which operate to by-pass the high frequencies to ground at that point. As this type of by-pass is made only at the walls of the can, however, the conductor leading from the component to the wall is free to radiate, and the shielding can is filled with high frequency standing waves which may then leak out through seams and holes which may be present in the shielding can.

Accordingly, what is needed is effective means for bypassing or killing the unwanted high frequencies at their source, within the tuner itself, before they can be effectively radiated. It is therefore a principal object of the present invention to provide means for achieving this result.

Another object of the present invention is to provide an elongate conductor having a relatively high distributed capacitance which may function as a low pass filter.

A further object of the present invention is to provide an elongate conductor having a distributed capacitance and means for providing an electrostatic shield about the conductor.

It is another object of the present invention to provide a conductor and a method of manufacturing therefor, by which conductors having high distributed capacitance may be easily and economically produced.

It is another object of this invention provide improved components including elongate conductors with dielectric oxide layers formed in situ thereon.

Another object of this invention is the formation of preformed elongate nickel conductors for use in the manufacture of circuit apparatus or components, wherein the preformed elongate electrical conductor is subsequently exposed to an oxidizing atmosphere to form an insulating dielectric film of NiO intermediate two conductive portions.

These and other objects of the present invention will be more readily understood by an examination of this specification and the accompanying drawings and claims.

In one embodiment of the present invention, there is provided a novel conductor having a centrally disposed inner conductor of nickel, a coating of insulating NiO surrounding the inner conductor, and a relatively thin coating of a conductive material overlying the insulating coating and serving as an outer conductor.

In another embodiment of the present invention, there is provided a novel conductor having an elongate inner conductor formed of a nonoxidizable metal, a coating of nickel overlying selected lengths of the inner conductor, a coating of insulating NiO overlying the oxidizable coating, and a relatively thin conductive outer coating overlying the insulating coating.

Reference will be now made to this specification and the accompanying drawing in which.

Figures 1, 2, 3, 4:
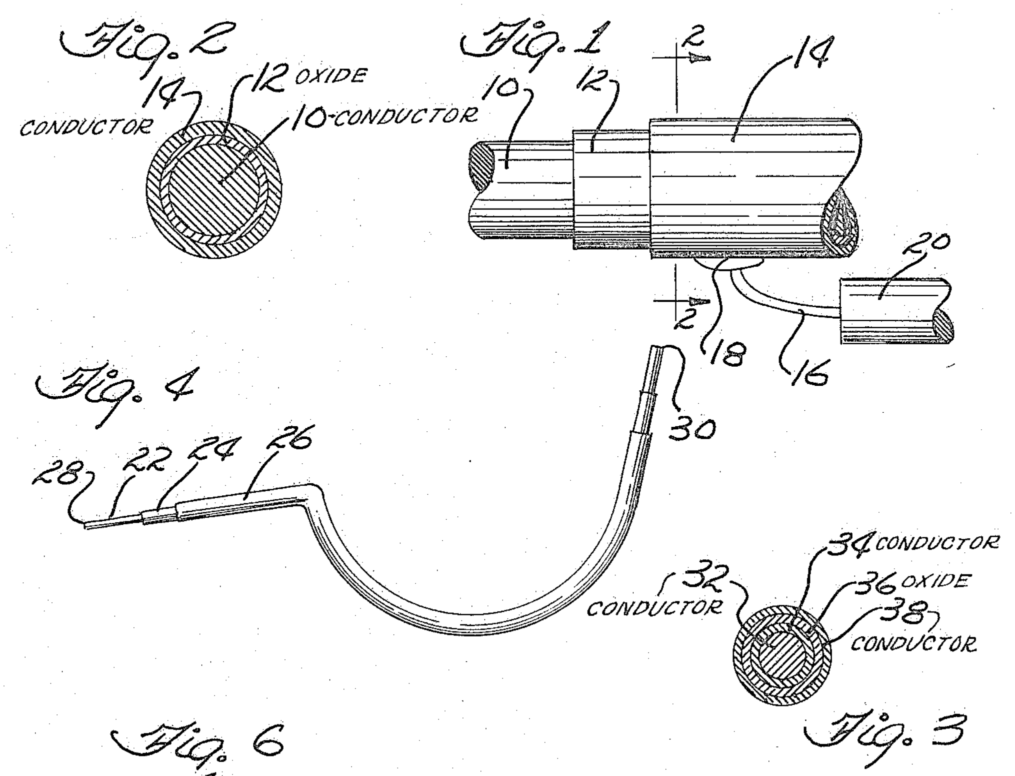
FIG. 1 is a side view of a conductor constructed in accordance with the present invention, with part of its layers broken away to better illustrate its construction.
FIG. 2 is a cross section of the cable of FIG. 1 taken along a section 2—2 thereof.
FIG. 3 is a cross section of another embodiment of a conductor incorporating the present invention.
FIG. 4 is a side view of a preformed section of conductor incorporating the present invention.

Referring now to FIGS. 1 and 2, there is illustrated a conductor having a central conductor 10 of nickel, an overlying sheath 12 of a dielectric material which is NiO, an insulating oxide of the metal of the central conductor 10, and an overlying outer conductor 14 surrounding the sheath 12.

The central conductor 10 is composed of nickel, which readily forms an insulating oxide having a relatively high dielectric constant when heated in an oxygen containing atmosphere at a predetermined temperature. Such metals are nickel, titanium, aluminum, tantalum, and the like. The outer conductor 14 is a conductive material which is preferably coated onto the inner conductor 10 before the apparatus is fired at the oxidizing temperature to form the insulating layer 12.

The outer conductor 14 is preferably an oxygen permeable conductive composition or paint which may be painted upon the inner conductor 10, or in which the inner conductor 10 may be dipped, prior to being oxidized.

The preferred form of oxygen-permeable paint comprises a paint having a major proportion of silver in particle form, and a minor amount of a frit such as $BiO_3$. The silver particles are believed to be in the nature of spheres such that all of the dimensions of each particle are substantially equal to each other. Of course, the actual shape of the particles may vary considerably from spherical shape without affecting the results obtained.

When nickel is used for the central conductor 10, it is preferably subjected to a firing temperature of approximately 1600° F., after the conductive coating 14 has been applied to the conductor 10, whereby a layer of NiO forms intermediate the central conductor 10 and the outer conductor 14. The oxide NiO is a good insulator, and a relatively thin layer removes the conductive coating 14 from electrical contact with the central conductor 10 by the formation of the oxide in situ therebetween, and forms a capacitance between the conductors 10 and 14. There is thus formed a conductor comprising an inner conductor 10 and an outer conductor 14 having a distributed capacitance therebetween, which is a function of the thickness of the oxide layer, and the dielectric constant of the oxide. When the outer conductor 14 is connected to a reference potential or ground, the capacitance serves as a short circuit for high frequencies applied to the inner conductor 10. In addition, the outer conductor 14 operates as an electrostatic shield. The outer conductor 14 is preferably connected to ground by means of a plurality of conductors 16 (only one of which is shown in FIG. 1) soldered to the outer conductor at spaced locations 18, one of which is adjacent the end of the inner conductor 10 which is attached to the source of the high frequencies sought to be eliminated. The conductors 16 may optionally be provided with insulating coatings 20.

A number of the oxides of oxidizable metals which are capable of being used in the present invention are relatively delicate and subject to fracture in response to high stresses resulting from bending or otherwise working the cable. Accordingly, it is preferred in using the present invention to preform the inner conductor before subjecting the conductor to the temperature required to form the desired oxide between the central and outer conductors. If the oxide coating fractures, however, the cable may be repaired, and restored to normal capacitance by refiring the cable at 1600° F. for a length of time sufficient to build up an additional thickness of NiO under the outer conductor 14, which heals the fracture, as disclosed in the copending application of Le Roy Dilger, Serial No. 274,043, filed April 18, 1963. FIG. 4 is an illustration of one such preformed conductor having a central conductor 22, an insulating oxide layer 24 and an outer conductor 26. The shape taken by the central conductor 22 is determined by its intended environment, and is preformed in the desired configuration to reach between the two desired points of interconnection, to which the ends 28 and 30 of the central conductor 2 are connected, by soldering or the like. The conductor of the present invention may be advantageously used in supplying low frequency sources of voltage to the tuner chassis, such as filament voltages or the like, whereby the capacitance present between the inner and outer conductors 22 and 26 operates to by-pass high frequencies to ground through a conductor (not shown) connected between the outer conductor 26 and a ground terminal. Preferably, a plurality of such conductors are employed. The conductor of FIG. 4 comprises, in effect, a feed-thru capacitor, and may be passed through an aperture in the tuner chassis or an electrostatic shield surrounding the tuner, without permitting unwanted high frequency components to escape. The techniques of this invention have the further advantage over more conventional feed-thru and stand-off capacitors that the transverse dielectric dimension is extremely small, while the length may be unlimited thus reducing or eliminating any cavity or similar resonant effects, even at extremely high frequencies.

Referring now to FIG. 3, there is illustrated a cross section of an alternative form of conductor in which a central conductor 32 may be formed of metal which does not readily form an insulating oxide. The central conductor 32 may be formed of copper or silver, or the like, both of which metals are excellent conductors, but which do not readily form oxides with sufficient insulating properties to insulate the inner and outer conductors from each other. The inner conductor 32 is then coated with a layer of oxidizable metal 34 such as nickel, tantalum, or the like, which may thereafter be treated in the same manner as explained with respect to FIGS. 1 and 2. There results a conductor having a central oxidizable metal conductor 34, a core 32 of nonoxidizable metal, the central conductor being surrounded with an insulating layer 36 and with an outer conductive layer 38.

Figure 6:
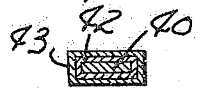
FIG. 6 is a cross section of the embodiment of FIG. 5 taken along the section 6—6.
Figures 5, 7, 8:
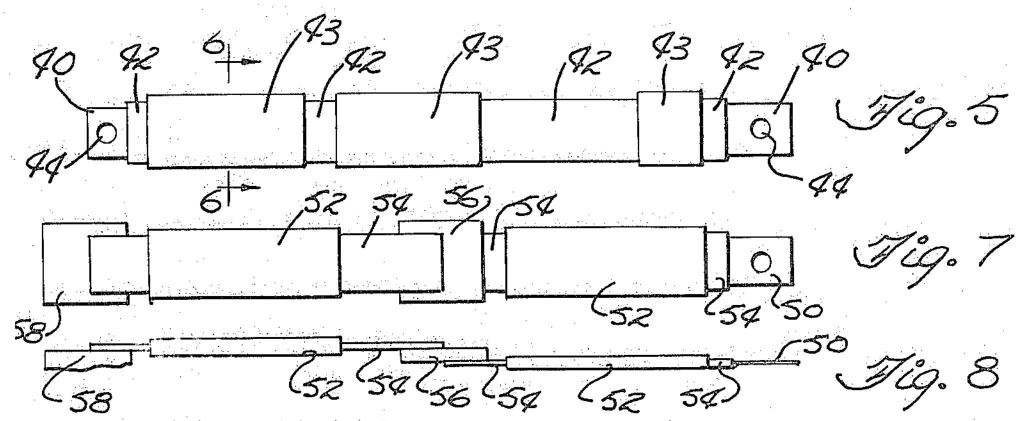
FIG. 5 is a side view of a further embodiment of the present invention.
FIG. 7 is a plan view of yet another embodiment of the present invention.
FIG. 8 is a side view of the apparatus illustrated in FIG. 7.

Referring now to FIGS. 5 and 6, there is illustrated a relatively flat conductor suitable for use as a bus bar or the like, having a centrally disposed conductor 40, which is formed with a layer of insulating oxide material 42. Certain sections of the insulating layer 42 are provided with overlying conductive portions 43. The bus bar of FIG. 5 may be formed in the same manner as has been explained above, namely, by forming the central conductor 40 of oxidizable metal, or coating the central conductor with such metal, and subjecting it to an elevated temperature at which an insulating oxide layer 42 is formed. The conductive outer coatings 43 are formed wherever it is desired that an electrostatic shield be provided around the central conductor 42. It is not necessary to make the shield continuous, but the same may be discontinuous and formed in a plurality of separate sections as illustrated in FIG. 5. Wherever it is desired to form a by-pass conductor 43, the central conductor 40 may be coated with an oxygen-permeable conductive material before being subjected to the firing temperature. The by-pass conductor is then connected to a reference potential to eliminate high frequencies. When fired, the oxide layer 42 then forms between the conductor 40 and the outer conductor 43, and also forms on the surfaces of the inner conductor 40 where it has not been coated with the oxygen-permeable material 43. If short circuit or low resistance areas are discovered in the product, it may be refired to grow additional oxide, improving the interconductor resistance while lowering the capacitance slightly.

A pair of apertures 44 are formed at the terminal portions of the inner conductor 40, to permit easy connection of the inner conductor 40 to electric terminals. The terminal portions of the inner conductor 40 (and intermediate portions, if desired) may be prevented from oxidizing by coating them with a layer of material which prevents oxidation, before coating the conductor with the oxygen-permeable paint. Such material may later be removed by scraping, filing, or the like to permit circuit components to be brought into electrical contact with the terminal portons of the inner conductor 40. Alternatively, and preferably, the terminal portions 40 are coated, before firing with a conductive material which is not oxygen-permeable and, therefore, prevents oxidation of the inner conductor 40. The preferred form of oxygen-impermeable material comprises a paint having a major proportion of silver in particle form, the particles apparently having a relatively flat flake-like shape, and a minor proportion of a frit such as lead borosilicate. Such a paint prevents substantial oxidation of the metal surface upon which it is painted, and therefore remains in electrical contact with the surface. By still another method, portions of the conductor 40 may be electroplated with gold, which prevents formation of an oxide layer during firing.

Referring now to FIGS. 7 and 8, there is illustrated another embodiment of the present invention in which only selected portions of a pair of series connected conductors 50 are provided with outer conductors 52 such as to form an electrostatic shield. Each of the inner conductors 50 has a central portion thereof coated with a layer of conductive material 52, and an oxide layer 54 intermediate the inner conductor 50 and the outer conductor 52. The two conductors 50 are joined together by a circuit component 56, which may be a resistor, capacitor or the like. Alternatively, the component 56 may be merely a connecting block serving to complete a circuit between the conductors 50. The terminals of the component 56 are preferably secured to the inner conductors 50, before the apparatus is subjected to the oxide-forming firing temperature, by spot welding or the like, which does not cause the parts so connected to loosen or pull apart at the firing temperature. When the component 56 cannot withstand the elevated firing temperature, however, the component 56 may be soldered to the inner conductors 50 after firing. A second component 58 is illustrated at one of the end terminals of the apparatus of FIG. 7, whereas the opposite end terminal is formed by a nonoxidized portion of the inner conductor 50. This portion may be prevented from forming an oxide layer by one of the methods discussed above.

Figure 9:
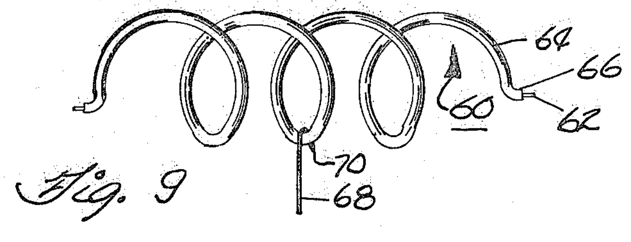
FIG. 9 is a perspective view of a circuit element incorporating the present invention.

Referring now to FIG. 9, there is illustrated a circuit element 60 formed of shileded cable such as that illustrated in FIGS. 1 to 4, which functions as a delay line. The element 60 is provided with an inner conductor 62 and an outer conductor 64, which are insulated from each other by an intermediate dielectric oxide layer 66. The central conductor 62 is formed of oxidizable metal, and the outer conductor 64 is a coating of an oxygen-permeable conductive material such that the oxide layer 66 forms when the coil 60 is subjected to the firing temperature. The outer conductor 64 is preferably connected to a reference potential or ground by a plurality of conductors 68 soldered to the outer conductor 64 at spaced points 70 to provide distributed capacitance to ground. The result is a conductor 62 which has a relatively high series inductance, due to the magnetic coupling among various turns of the coil, and a relatively high distributed capacitance to ground. A signal passing along the conductor 62 is delayed in time by an amount dependent upon the values of the capacitance and inductance.

In the coil of FIG. 9, the outer conductor 64 is preferably formed of a conductive material which has a relatively low magnetic permeability, such as silver, so that the central conductor 62, while being shielded electrostatically, is not shielded magnetically. Current flowing through each portion of the inner conductor 62 therefore produces magnetic flux which gives rise to flux linkages with current flowing through other portions of the coil 60, while the coil is shielded electrostatically, and is therefore immune to electrostatic fields surrounding the coil 60. The series inductance of the coil 60 may be raised, while at the same time reducing the coupling between various turns of the coil by surrounding the outer conductor with a material having a high magnetic permeability such as ferrite. This may be accomplished by coating the conductor 64 with a layer of ferrite material, or by embedding the entire coil 60 in a ferrite block. Alternative methods which may be employed are wrapping a ribbon of ferromagnetic material about the conductor, or electroplating a layer of ferromagnetic material onto the surface of the outer conductor.

The foregoing specification and the drawings emphasize the advantages attained where a conductive outer layer is disposed on the oxidized surface of the elongate inner conductor to attain shielding and capacitive by-pass. These advantages result from the high leakage resistance, relatively good dielectric characteristics, the impervious and homogeneous surface characteristics, strength and temperature characteristics of certain oxides and especially the oxide of nickel, NiO.

The foregoing will so fully and completely explain my invention as to permit others skilled in the art, by applying current knowledge, to adapt the same for varying conditions of service, without departing from the essential features of novelty which are intended to be defined and secured by the appended claims.

What is claimed is:

1. A low-pass filter comprising an elongate cylindrical central conductor formed essentially of nickel and having one dimension substantially greater than any dimension transverse to said one dimension, an outer conductor having a low resistivity entirely surrounding the cylindrical sides of said inner conductor, and a layer of NiO intermediate said inner and outer conductors, said NiO layer being formed in situ on the surface of said central conductor, said central conductor being adapted to be connected to carry current in an electrical circuit, and said outer conductor being adapted to be connected to ground to bypass high frequency components of said current to ground.

2. The filter according to claim 1, wherein said outer conductor is oxygen permeable.

3. A capacitor comprising an elongate inner conductor formed essentially of nickel, an outer, oxygen permeable conductor surrounding said inner conductor, and a layer of NiO, formed in situ, intermediate said inner and outer conductors, said inner conductor forming one terminal of said capacitor and said outer conductor forming a second terminal of said capacitor.

4. A capacitor comprising an elongate inner conductor formed essentially of nickel, a coating of NiO covering a substantial portion of the surface of said inner conductor, and a plurality of oxygen-permeable conductive coatings overlying spaced-apart portions of said NiO coating, said inner conductor forming one terminal of said capacitor, and said oxygen-permeable conductive coatings forming other terminals of said capacitor.

5. A circuit element having series inductance and distributed capacitance for delaying an electrical signal, comprising an elongate inner conductor formed essentially of nickel for transmitting said electrical signal, a dielectric sheath formed essentially of NiO surrounding said inner conductor, and an oxygen-permeable conductive coating surrounding said dielectric sheath, said conductor, said sheath and said coating being in the form of a helix to bring about flux linkages between different portions of said circuit element, said inner conductor forming one terminal of said shunt capacitance and said conductive coating forming another terminal of said shunt capacitance.

References Cited by the Examiner

UNITED STATES PATENTS

| | | | |
|---|---|---|---|
| 1,996,186 | 4/1935 | Affel | 174—32 |
| 2,088,949 | 8/1937 | Fekete. | |
| 2,238,915 | 4/1941 | Peters et al. | 174—126 X |
| 2,301,320 | 11/1942 | Phillips et al. | |
| 2,792,442 | 5/1957 | Parce | 174—32 |
| 2,879,318 | 3/1959 | Straube | 174—36 |
| 2,899,345 | 8/1959 | Oshry | 317—258 X |
| 2,956,909 | 10/1960 | Robinson | 117—217 |
| 3,001,893 | 9/1961 | Kreuchen et al. | 117—217 |
| 3,113,253 | 12/1963 | Ishikawa et al. | 161—225 X |

FOREIGN PATENTS

| | | |
|---|---|---|
| 438,444 | 11/1935 | Great Britain. |

ROBERT K. SCHAEFER, *Primary Examiner.*

DARRELL L. CLAY, JOHN F. BURNS, *Examiners.*

DONALD A. KETTLESTRINGS, *Assistant Examiner.*